(12) United States Patent
Goji et al.

(10) Patent No.: US 10,792,545 B2
(45) Date of Patent: Oct. 6, 2020

(54) GOLF CLUB GRIP AND GOLF CLUB

(71) Applicant: Sumitomo Rubber Industries, Ltd., Kobe-shi, Hyogo (JP)

(72) Inventors: Sho Goji, Kobe (JP); Kazuyoshi Shiga, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 99 days.

(21) Appl. No.: 16/172,554

(22) Filed: Oct. 26, 2018

(65) Prior Publication Data

US 2019/0126111 A1   May 2, 2019

(30) Foreign Application Priority Data

Oct. 27, 2017   (JP) .................................. 2017-207766

(51) Int. Cl.
*A63B 53/14*   (2015.01)
*C08L 93/04*   (2006.01)
(Continued)

(52) U.S. Cl.
CPC .............. *A63B 53/14* (2013.01); *A63B 60/08* (2015.10); *A63B 60/14* (2015.10); *C08K 3/04* (2013.01);
(Continued)

(58) Field of Classification Search
None
See application file for complete search history.

(56) References Cited

U.S. PATENT DOCUMENTS 6,642,315 B2 * 11/2003 Amino .................... C08L 21/00
                                                         525/191
9,630,077 B2 *  4/2017 Mikura .................. A63B 60/08
(Continued)

FOREIGN PATENT DOCUMENTS

JP         6041971 B1    12/2016

OTHER PUBLICATIONS

TDS of SEAST SO (FEF) carbon black, Universal Selector, Dec. 13, 2018 (Year: 2018).*

*Primary Examiner* — Peter A Salamon
(74) *Attorney, Agent, or Firm* — Birch, Stewart, Kolasch & Birch, LLP

(57) ABSTRACT

An object of the present invention is to provide a golf club grip having excellent abrasion resistance and a high coefficient of friction. The present invention provides a golf club grip comprising an outermost layer, wherein at least a part of the outermost layer is formed from a rubber composition containing (A) a base rubber and (B) carbon black, (B) the carbon black has a DBP absorption amount in a range from 50 cm$^3$/100 g to 140 cm$^3$/100 g and a CTAB specific surface area in a range from 30 m$^2$/g to 160 m$^2$/g, a product (amount×DBP absorption amount) obtained by multiplying an amount (g) of (B) the carbon black in the rubber composition with respect to 100 g of (A) the base rubber by the DBP absorption amount (cm$^3$/100 g) ranges from 380 to 2600, a product (amount×CTAB specific surface area) obtained by multiplying the amount (g) of (B) the carbon black in the rubber composition with respect to 100 g of (A) the base rubber by the CTAB specific surface area (m$^2$/g) ranges from 425 to 3000, and the part formed from the rubber composition has tan δ(30° C., 10 Hz) in a range from 0.100 to 0.280.

20 Claims, 2 Drawing Sheets

(51) Int. Cl.

| | | |
|---|---|---|
| *A63B 60/08* | (2015.01) | |
| *C08K 3/04* | (2006.01) | |
| *C08K 3/22* | (2006.01) | |
| *C08K 5/09* | (2006.01) | |
| *C08K 5/14* | (2006.01) | |
| *C08K 5/40* | (2006.01) | |
| *C08L 13/00* | (2006.01) | |
| *C08L 15/00* | (2006.01) | |
| *C08L 23/08* | (2006.01) | |
| *C08L 45/02* | (2006.01) | |
| *C08L 7/00* | (2006.01) | |
| *C08L 9/02* | (2006.01) | |
| *A63B 60/14* | (2015.01) | |
| *C08K 3/06* | (2006.01) | |

(52) U.S. Cl.
CPC ............... *C08K 3/22* (2013.01); *C08K 5/09* (2013.01); *C08K 5/14* (2013.01); *C08K 5/40* (2013.01); *C08L 7/00* (2013.01); *C08L 9/02* (2013.01); *C08L 13/00* (2013.01); *C08L 15/005* (2013.01); *C08L 23/0853* (2013.01); *C08L 45/02* (2013.01); *C08L 93/04* (2013.01); *C08K 3/06* (2013.01); *C08K 2201/006* (2013.01)

(56) References Cited

U.S. PATENT DOCUMENTS

| | | | |
|---|---|---|---|
| 2008/0095696 A1* | 4/2008 | Matsushima | C09C 1/50 423/449.1 |
| 2011/0294936 A1* | 12/2011 | Sato | B60C 1/0016 524/315 |
| 2012/0129624 A1* | 5/2012 | Ito | A63B 53/14 473/303 |
| 2014/0371372 A1* | 12/2014 | Hirayama | C08K 3/36 524/493 |
| 2015/0111985 A1* | 4/2015 | Tanabe | C08K 5/548 523/156 |
| 2015/0119496 A1* | 4/2015 | Yanagisawa | B01D 33/35 523/351 |
| 2015/0119504 A1* | 4/2015 | Park | B60O 1/00 524/35 |
| 2015/0298511 A1* | 10/2015 | Kameda | B60C 1/00 152/517 |
| 2015/0322232 A1* | 11/2015 | Hong | C08L 7/00 524/574 |
| 2016/0002371 A1* | 1/2016 | Sato | C08L 21/00 525/236 |
| 2016/0009843 A1* | 1/2016 | Sato | C08L 21/00 525/236 |
| 2016/0297947 A1* | 10/2016 | Sakaki | B60C 1/0016 |
| 2017/0182386 A1* | 6/2017 | Inoue | A63B 53/14 |
| 2017/0305192 A1* | 10/2017 | Yokoyama | B60C 7/00 |
| 2019/0126111 A1* | 5/2019 | Goji | C08L 13/00 |

\* cited by examiner

GOLF CLUB GRIP AND GOLF CLUB

FIELD OF THE INVENTION

The present invention relates to a golf club grip.

DESCRIPTION OF THE RELATED ART

As a grip provided on a golf club, a rubber grip is widely used. As a method of improving fitting feel or anti-slipping performance of such a grip, it has been proposed to blend a resin into a rubber composition constituting the grip. For example, Japanese Patent Publication No. 6041971 B discloses a sport goods grip comprising an outermost layer formed from a surface layer rubber composition, wherein the surface layer rubber composition contains (A) a base rubber and (B) a resin having a softening point in a range from 5° C. to 120° C., (A) the base rubber contains an acrylonitrile-butadiene based rubber, the acrylonitrile-butadiene based rubber is a carboxy-modified hydrogenated acrylonitrile-butadiene rubber, and (B) the resin is at least one member selected from the group consisting of a hydrogenated rosin ester, a disproportionated rosin ester, an ethylene-vinyl acetate copolymer, a coumarone resin, a phenol resin, a xylene resin and a styrene resin.

SUMMARY OF THE INVENTION

The method of improving the fitting feel or anti-slipping performance of the grip by blending the resin into the rubber composition constituting the grip has been proposed. However, if such a resin is blended, the strength of the base rubber tends to be lowered.

The present invention has been made in view of the abovementioned circumstances, and an object of the present invention is to provide a golf club grip having excellent abrasion resistance and a high coefficient of friction.

The golf club grip according to the present invention that has solved the above problem comprises an outermost layer, wherein at least a part of the outermost layer is formed from a rubber composition containing (A) a base rubber and (B) carbon black, (B) the carbon black has a DBP absorption amount in a range from 50 cm$^3$/100 g and a CTAB specific surface area in a range from 30 m$^2$/g to 160 m$^2$/g, a product (amount×DBP absorption amount) obtained by multiplying an amount (g) of (B) the carbon black in the rubber composition with respect to 100 g of (A) the base rubber by the DBP absorption amount (cm$^3$/100 g) ranges from 380 to 2600, a product (amount×CTAB specific surface area) obtained by multiplying the amount (g) of (B) the carbon black in the rubber composition with respect to 100 g of (A) the base rubber by the CTAB specific surface area (m$^2$/g) ranges from 425 to 3000, and the part formed from the rubber composition has tan δ(30° C., 10 Hz) in a range from 0.100 to 0.280.

According to the present invention, a golf club grip having excellent abrasion resistance and a high coefficient of friction is obtained.

DESCRIPTION OF THE PREFERRED EMBODIMENT

Figure 1:
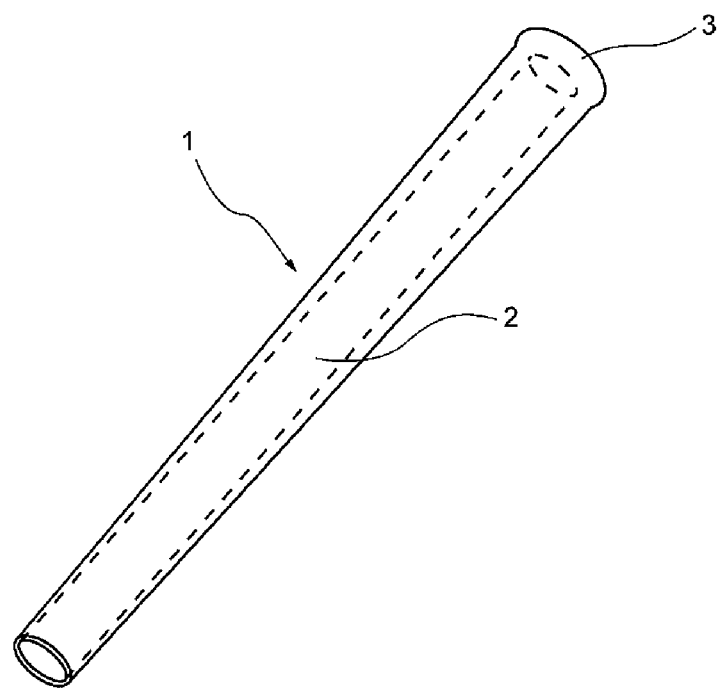
FIG. 1 is a perspective view showing one example of a golf club grip.

The present invention provides a golf club grip comprising an outermost layer, wherein at least a part of the outermost layer is formed from a first rubber composition containing (A) a base rubber and (B) carbon black, (B) the carbon black has a DBP absorption amount in a range from 50 cm$^3$/100 g to 140 cm$^3$/100 g and a CTAB specific surface area in a range from 30 m$^2$/g to 160 m$^2$/g, a product (amount×DBP absorption amount) obtained by multiplying an amount (g) of (B) the carbon black in the first rubber composition with respect to 100 g of (A) the base rubber by the DBP absorption amount (cm$^3$/100 g) ranges from 380 to 2600, a product (amount×CTAB specific surface area) obtained by multiplying the amount (g) of (B) the carbon black in the first rubber composition with respect to 100 g of (A) the base rubber by the CTAB specific surface area (m$^2$/g) ranges from 425 to 3000, and the part formed from the first rubber composition has tan δ(30° C., 10 Hz) in a range from 0.100 to 0.280.

If (B) the carbon black having the specified properties is used as the reinforcing material blended into the rubber composition, and the product (amount×DBP absorption amount) and the product (amount×CTAB specific surface area) are adjusted, the coefficient of friction of the obtained outermost layer can be increased without lowering the abrasion resistance of the obtained outermost layer. In addition, if the tan δ(30° C., 10 Hz) of the outermost layer is adjusted in the range from 0.100 to 0.280, the hysteresis loss at deformation becomes greater and the anti-slipping performance of the grip is improved.

[Outermost Layer]

At least a part of the outermost layer of the golf club grip is formed from the first rubber composition. Herein, the outermost layer means an outermost layer of the grip, i.e. a portion touched by the user when using the grip. It is preferred that at least a part of the golf club grip portion touched by the user when using the grip is formed from the first rubber composition. The area ratio of the portion formed from the first rubber composition on the outermost layer of the golf club grip is preferably 50 area % or more, more preferably 70 area % or more, and even more preferably 90 area % or more. Further, it is also preferred that the entire outermost layer of the golf club grip is formed from the first rubber composition. It is noted that, when the golf club grip has a cylindrical portion as described later, the entire outermost layer of the cylindrical portion is preferably formed from the first rubber composition.

The tan δ(30° C., 10 Hz) of the part formed from the first rubber composition is 0.100 or more, preferably 0.125 or more, more preferably 0.150 or more, and even more preferably 0.175 or more, and is 0.280 or less, preferably 0.250 or less, more preferably 0.225 or less, and even more preferably 0.200 or less. If the tan δ is 0.100 or more, decrease in the abrasion resistance of the part formed from the first rubber composition is inhibited, and if the tan δ is 0.280 or less, the part formed from the first rubber composition has an appropriate hardness. It is noted that the tan δ can be controlled by adjusting the type or amount of (B) the carbon black.

The first rubber composition contains (A) the base rubber and (B) carbon black.

(A) Base Rubber

The amount of (A) the base rubber in the first rubber composition is preferably 50 mass % or more, more preferably 55 mass % or more, and even more preferably 60 mass % or more. Examples of (A) the base rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxy-modified acrylonitrile-butadiene rubber (XNBR), butadiene rubber (BR), styrene-butadiene rubber (SBR), polyurethane rubber (PU), isoprene rubber(IR), chloroprene rubber (CR), and ethylene-propylene rubber (EPM). These base rubbers may be used solely, or two or more of them may be used in combination.

(A) The base rubber preferably contains an acrylonitrile-butadiene based rubber. Examples of the acrylonitrile-butadiene based rubber include acrylonitrile-butadiene rubber (NBR), carboxy-modified acrylonitrile-butadiene rubber (XNBR), hydrogenated acrylonitrile-butadiene rubber (HNBR), and carboxy-modified hydrogenated acrylonitrile-butadiene rubber (HXNBR). The XNBR is a copolymer obtained by using a monomer having a carboxy group, acrylonitrile and butadiene. The HNBR is a hydrogenated product of an acrylonitrile-butadiene rubber. The HXNBR is a hydrogenated product of a copolymer obtained by using a monomer having a carboxy group, acrylonitrile and butadiene.

The amount of the acrylonitrile-butadiene based rubber in (A) the base rubber is preferably 50 mass % or more, more preferably 60 mass % or more, and even more preferably 70 mass % or more. Further, it is also preferred that (A) the base rubber in the first rubber composition consists of the acrylonitrile-butadiene based rubber.

The amount of the acrylonitrile in the NBR, XNBR, HNBR or HXNBR is preferably 15 mass % or more, more preferably 18 mass % or more, and even more preferably 21 mass % or more, and is preferably 50 mass % or less, more preferably 45 mass % or less, and even more preferably 40 mass % or less. If the amount of the acrylonitrile is 15 mass % or more, the grip has better abrasion resistance, and if the amount of the acrylonitrile is 50 mass % or less, the grip has better touch feeling in a cold region or in winter.

The amount of a double bond in the HNBR or HXNBR is preferably 0.09 mmol/g or more, more preferably 0.2 mmol/g or more, and is preferably 2.5 mmol/g or less, more preferably 2.0 mmol/g or less, and even more preferably 1.5 mmol/g or less. If the amount of the double bond is 0.09 mmol/g or more, vulcanization is easily carried out during molding and the grip has enhanced tensile strength, and if the amount of the double bond is 2.5 mmol/g or less, the grip has better durability (weather resistance) and tensile strength. The amount of the double bond can be adjusted according to the amount of butadiene in the copolymer or the amount of hydrogen addition of the copolymer.

Examples of the monomer having the carboxy group in the XNBR or HXNBR include acrylic acid, methacrylic acid, fumaric acid, and maleic acid. The amount of the monomer having the carboxy group in the XNBR or HXNBR is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the amount of the monomer having the carboxy group is 1.0 mass % or more, the grip has better abrasion resistance, and if the amount of the monomer having the carboxy group is 30 mass % or less, the grip has better touch feeling in a cold region or in winter.

The amount of the carboxy group in the XNBR or HXNBR is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the amount of the carboxy group is 1.0 mass % or more, the grip has better abrasion resistance, and if the amount of the carboxy group is 30 mass % or less, the grip has better touch feeling in a cold region or in winter.

(B) Carbon Black

The carbon black is obtained by allowing a hydrocarbon that is a raw material to incompletely burn. The carbon black exists in a state that particles thereof are melted together, and this collective entity of the particles is called an aggregate. In addition, the developed level of the aggregate is called a structure.

The DBP (dibutyl phthalate) absorption amount of (B) the carbon black is preferably 50 $cm^3$/100 g or more, more preferably 60 $cm^3$/100 g or more, and even more preferably 70 $cm^3$/100 g or more, and is preferably 140 $cm^3$/100 g or less, more preferably 135 $cm^3$/100 g or less, and even more preferably 130 $cm^3$/100 g or less. If the DBP absorption amount is 50 $cm^3$/100 g or more, the reinforcing effect by the carbon black is greater, and if the DBP absorption amount is 140 $cm^3$/100 g or less, the dispersibility of the carbon black in the rubber composition is better. The DBP absorption amount shows an ability of absorbing the oil (dibutyl phthalate) in the voids made by the aggregate. The voids made by the aggregate of the carbon black is greater and the oil absorption amount is greater if the structure is more developed. The DBP absorption amount of the carbon black is measured according to JIS K6217-4 (2008) by using a compressed sample.

The CTAB specific surface area of (B) the carbon black is preferably 30 $m^2$/g or more, more preferably 35 $m^2$/g or more, and even more preferably 40 $m^2$/g or more, and is preferably 160 $m^2$/g or less, more preferably 155 $m^2$/g or less, and even more preferably 150 $m^2$/g or less. If the CTAB specific surface area is 30 $m^2$/g or more, the reinforcing effect by the carbon black is greater, and if the CTAB specific surface area is 160 $m^2$/g or less, the obtained crosslinked rubber does not become excessively hard. The CTAB specific surface area is a specific surface area calculated based on the adsorption of n-hexadecyl trimethyl ammonium bromide (CTAB). This specific surface area excludes the area of fine pores into which the CTAB molecule cannot enter. The CTAB specific surface area of the carbon black is measured according to JIS K6217-3 (2001).

The amount of (B) the carbon black in the first rubber composition is preferably 3 parts by mass or more, more preferably 4 parts by mass or more, and even more preferably 5 parts by mass or more, and is preferably 20 parts by mass or less, more preferably 18 parts by mass or less, and even more preferably 15 parts by mass or less, with respect to 100 parts by mass of (A) the base rubber. If the amount is 3 parts by mass or more, the reinforcing effect by the carbon black is greater, and if the amount is 20 parts by mass or less, the obtained crosslinked rubber does not become excessively hard.

The product (amount×DBP absorption amount) obtained by multiplying the amount (g) of (B) the carbon black in the first rubber composition with respect to 100 g of (A) the base rubber by the DBP absorption amount ($cm^3$/100 g) is preferably 380 or more, more preferably 600 or more, and even more preferably 800 or more, and is preferably 2600 or less, more preferably 2500 or less, and even more preferably 2400 or less. If the product (amount×DBP absorption amount) is 380 or more, the reinforcing effect by the carbon black is greater, and if the product (amount×DBP absorption amount) is 2600 or less, the dispersibility of the carbon black in the rubber composition is better.

The product (amount×CTAB specific surface area) obtained by multiplying the amount (g) of (B) the carbon black in the first rubber composition with respect to 100 g of (A) the base rubber by the CTAB specific surface area ($m^2/g$) is preferably 425 or more, more preferably 500 or more, and even more preferably 600 or more, and is preferably 3000 or less, more preferably 2900 or less, and even more preferably 2800 or less. If the product (amount×CTAB specific surface area) is 425 or more, the reinforcing effect by the carbon black is greater, and if the product (amount× CTAB specific surface area) is 3000 or less, the obtained crosslinked rubber does not become excessively hard.

(Crosslinking Agent)

The first rubber composition further contains a crosslinking agent in addition to (A) the base rubber and (B) carbon black. As the crosslinking agent, a sulfur based crosslinking agent and an organic peroxide may be used. Examples of the sulfur based crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis (t-butylperoxy-m-diisopropyl)benzene, 2,5-dimethyl-2,5-di (t-butylperoxy) hexane, and 1,1-bis(t-butylperoxy)-3,3,5-trimethylcyclohexane. The crosslinking agent may be used solely, or two or more of them may be used in combination. As the crosslinking agent, the sulfur based crosslinking agent is preferred, and the elemental sulfur is more preferred. The amount of the crosslinking agent is preferably 0.2 part by mass or more, more preferably 0.4 part by mass or more, and even more preferably 0.6 part by mass or more, and is preferably 4.0 parts by mass or less, more preferably 3.5 parts by mass or less, and even more preferably 3.0 parts by mass or less, with respect to 100 parts by mass of (A) the base rubber.

The first rubber composition preferably further contains a vulcanization accelerator or a vulcanization activator.

(Vulcanization Accelerator)

Examples of the vulcanization accelerator include thiurams such as tetramethylthiuram disulfide (TMTD), tetrabenzylthiuram disulfide (TBzTD), tetramethylthiuram monosulfide (TMTM), and dipentamethylenethiuram tetrasulfide; guanidines such as diphenylguanidine (DPG); dithiocarbamates such as zinc dimethyldithiocarbamate (Zn-PDC), and zinc dibutyldithiocarbamate; thioureas such as trimethylthiourea, and N,N'-diethylthiourea; thiazoles such as mercaptobenzothiazole (MBT), and benzothiazole disulfide; and sulfenamides such as N-cyclohexyl-2-benzothiazolylsulfenamide (CBS), and N-t-butyl-2-benzothiazolylsulfenamide (BBS). These vulcanization accelerators may be used solely, or two or more of them may be used in combination. The total amount of the vulcanization accelerator is preferably 0.4 part by mass or more, more preferably 0.8 part by mass or more, and even more preferably 1.2 parts by mass or more, and is preferably 8.0 parts by mass or less, more preferably 7.0 parts by mass or less, and even more preferably 6.0 parts by mass or less, with respect to 100 parts by mass of (A) the base rubber.

(Vulcanization Activator)

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination. The total amount of the vulcanization activator is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less, with respect to 100 parts by mass of (A) the base rubber.

The first rubber composition may further contain a reinforcing material, antioxidant, softening agent, coloring agent, antiscorching agent, resin or the like, where necessary.

Examples of the reinforcing material include silica. It is noted that, in the first rubber composition, the tan δ of the crosslinked rubber is controlled by (B) the carbon black. Thus, it is preferred that the amount of the reinforcing material such as silica in the first rubber composition is decreased. The amount of this reinforcing material is preferably 10 parts by mass or less, more preferably 5 parts by mass or less, and even more preferably 1 parts by mass or less, with respect to 100 parts by mass of (A) the base rubber.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-α-naphtylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, and even more preferably 0.4 part by mass or more, and is preferably 5.0 parts by mass or less, more preferably 4.8 parts by mass or less, and even more preferably 4.6 parts by mass or less, with respect to 100 parts by mass of (A) the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the antiscorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio) phthalimide, sulfonamide derivative, diphenyl urea, bis(tridecyl)pentaerythritol diphosphite, and 2-mercaptobenzimidazole.

Examples of the resin include a hydrogenated rosin ester, disproportionated rosin ester, ethylene-vinyl acetate copolymer, coumarone resin, phenol resin, xylene resin, and styrene resin. The amount of the resin is preferably more than 0 part by mass, more preferably 7 parts by mass or more, and even more preferably 14 parts by mass or more, and is preferably 30 parts by mass or less, more preferably 25 parts by mass or less, and even more preferably 20 parts by mass or less, with respect to 100 parts by mass of (A) the base rubber.

The first rubber composition may be prepared by a conventionally known method, for example, by kneading raw materials with a kneading machine such as Banbury mixer, kneader, and open roll. It is noted that when the first rubber composition contains microballoons which will be described later, it is preferred that other components than the microballoons are kneaded in advance followed by kneading the kneaded product and the microballoons. The material temperature when kneading the kneaded product and the microballoons is preferably set to be lower than the expansion starting temperature of the microballoons.

The outermost layer may be a solid layer or a porous layer. If the outermost layer is a porous layer, the golf club grip has a light weight. The porous layer is a layer having numerous fine pores (voids) formed in a rubber that is a base material. If numerous fine pores are formed therein, the outermost layer has a small apparent density, and thus has a light weight.

Examples of the method for preparing the porous layer include a balloon foaming method, chemical foaming method, supercritical carbon dioxide injection molding method, salt extraction method, and solvent removing method. In the balloon foaming method, microballoons are allowed to be included in the rubber composition, and then be expanded by heating to perform foaming. In addition, expanded microballoons may be blended in the rubber composition, and then the resultant rubber composition is molded. In the chemical foaming method, a foaming agent (such as azodicarbonamide, azobisisobutyronitrile, N,N'-dinitrosopentamethylene tetramine, p-toluenesulfonyl hydrazine, and p-oxybis(benzenesulfono hydrazide)) or a foaming auxiliary is allowed to be included in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and carbon dioxide is gasified to perform foaming. In the salt extraction method, a soluble salt (such as boric acid and calcium chloride) is allowed to be included in the rubber composition, and then the salt is dissolved and extracted therefrom after molding to form fine pores. In the solvent removing method, a solvent is allowed to be included in the rubber composition, and then the solvent is removed therefrom after molding to form fine pores.

When the outermost layer is a porous layer, the porous layer is preferably a foamed layer formed from the first rubber composition containing a foaming agent. In particular, the porous layer is preferably a foamed layer prepared by the balloon foaming method. In other words, the outermost layer is preferably a foamed layer formed from the first rubber composition containing microballoons. If the microballoons are used, the outermost layer has a light weight while maintaining the mechanical strength thereof.

As the microballoons, either organic microballoons or inorganic microballoons may be used. Examples of the organic microballoons include hollow particles formed from a thermoplastic resin, and resin capsules encapsulating a hydrocarbon with a low boiling point in a shell formed from a thermoplastic resin. Specific examples of the resin capsules include Expancel available from Akzo Nobel Company, and Matsumoto Microsphere (registered trademark) available from Matsumoto Yushi Seiyaku Co., Ltd. Examples of the inorganic microballoons include hollow glass particles (such as silica balloons and alumina balloons), and hollow ceramic particles.

The volume average particle size of the resin capsules (before expansion) is preferably 5 µm or more, more preferably 6 µm or more, and even more preferably 9 µm or more, and is preferably 90 µm or less, more preferably 70 µm or less, and even more preferably 60 µm or less.

When the outermost layer is prepared by the balloon foaming method, the amount of the microballoons in the first rubber composition is preferably 1.0 part by mass or more, more preferably 1.2 parts by mass or more, and even more preferably 1.5 parts by mass or more, and is preferably 10 parts by mass or less, more preferably 8 parts by mass or less, and even more preferably 6 parts by mass or less, with respect to 100 parts by mass of (A) the base rubber. If the amount of the microballoons is 1.0 part by mass or more, the foam is more uniform when forming the porous layer, and if the amount of the microballoons is 10 parts by mass or less, the porous layer strikes a good balance between the light weight and the mechanical strength.

The material hardness (Shore A hardness) of the first rubber composition is preferably 35 or more, more preferably 40 or more, and even more preferably 45 or more, and is preferably 59 or less, more preferably 56 or less, and even more preferably 53 or less. If the material hardness (Shore A hardness) of the first rubber composition is 35 or more, the mechanical strength of the outermost layer is further enhanced, and if the material hardness (Shore A hardness) of the first rubber composition is 59 or less, the outermost layer does not become excessively hard and thus the grip feeling when holding the grip becomes better.

[Other Portion]

The material for forming other portion of the golf club grip than the portion formed from the first rubber composition is not particularly limited. Examples of the second composition for forming the other portion include a second rubber composition and a resin composition.

The second rubber composition preferably contains a base rubber and a crosslinking agent. Examples of the base rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxy-modified acrylonitrile-butadiene rubber (XNBR), carboxy-modified hydrogenated acrylonitrile-butadiene rubber (HXNBR), butadiene rubber (BR), styrene-butadiene rubber (SBR), polyurethane rubber (PU), isoprene rubber (IR), chloroprene rubber (CR), and ethylene-propylene rubber (EPM). Among them, NR, EPDM, IIR, NBR, HNBR, XNBR, HXNBR, BR, SBR, and PU are preferred as the base rubber.

Examples of the crosslinking agent used in the second rubber composition include the same one as those used for the first rubber composition, and the elemental sulfur is preferred. The second rubber composition preferably further contains a vulcanization accelerator and a vulcanization activator. Examples of these vulcanization accelerator and vulcanization activator include the same one as those used for the first rubber composition. As the vulcanization accelerator, N-t-butyl-2-benzothiazolylsulfenamide and tetrabenzylthiuram disulfide are preferred. As the vulcanization activator, zinc oxide and stearic acid are preferred.

The second rubber composition may further contain a reinforcing material, antioxidant, softening agent, coloring agent, antiscorching agent and the like, where necessary. Examples of the reinforcing material, antioxidant and coloring agent include the same one as those used for the first rubber composition. As the reinforcing material, carbon black and silica are preferred. As the antioxidant, 2,2'-methylene bis(4-methyl-6-t-butylphenol) is preferred.

The second rubber composition may be prepared by a conventionally known method, for example, by kneading raw materials with a kneading machine such as Banbury mixer, kneader, and open roll. The temperature (material temperature) when performing the kneading preferably ranges from 70° C. to 160° C. It is noted that when the second rubber composition contains microballoons, the kneading is preferably performed at a temperature lower than the expansion starting temperature of the microballoons.

The resin composition contains a base resin. Examples of the base resin include a polyurethane resin, polystyrene resin, polyethylene resin, polypropylene resin, ethylene-vinyl acetate copolymer resin, and polyethylene terephthalate resin.

The second composition for forming the other portion is preferably the second rubber composition, and preferably contains natural rubber (NR), ethylene-propylene-diene rubber (EPDM) or butyl rubber (IIR) as the base rubber. In addition, when the first rubber composition contains the acrylonitrile-butadiene based rubber as (A) the base rubber, the second rubber composition for forming the other portion also preferably contains the acrylonitrile-butadiene based rubber as the base rubber. If the composition for forming the other portion contains the acrylonitrile-butadiene based rubber, adhesion between the portion formed from the first rubber composition and the other portion is enhanced.

The other portion may be solid or porous. In the case that the other portion is porous, the other portion preferably has a foamed construction formed from the second composition containing microballoons. If the microballoons are used, the formed portion has a light weight while maintaining the mechanical strength thereof. Examples of the microballoons include the same one as those used for the first rubber composition, and the resin capsules encapsulating a hydrocarbon with a low boiling point in a shell formed from a thermoplastic resin is preferred.

[Construction]

The shape of the golf club grip is not particularly limited, and a golf club grip having a cylindrical portion is preferred. If the golf club grip has a cylindrical portion, a shaft or the like can be inserted into the cylindrical portion. Further, the cylindrical portion may have either a single-layered construction or a multi-layered construction. When the cylindrical portion has a single-layered construction, the entire cylindrical portion is formed from the first rubber composition. When the cylindrical portion has a multi-layered construction, at least a part of or the entire outermost layer is formed from the first rubber composition.

The thickness of the cylindrical portion is preferably 0.5 mm or more, more preferably 1.0 mm or more, and even more preferably 1.5 mm or more, and is preferably 17.0 mm or less, more preferably 10.0 mm or less, and even more preferably 8.0 mm or less. The cylindrical portion may be formed with a fixed thickness along the axis direction thereof, or may be formed with a thickness gradually becoming thicker from the front end toward the back end.

The golf club grip preferably has a dual-layered cylindrical portion composed of a cylindrical inner layer and a cylindrical outer layer covering the cylindrical inner layer. If the cylindrical portion has the dual-layered construction, the mechanical properties of the cylindrical portion are easily controlled. It is preferred that at least a part of the cylindrical outer layer is formed from the first rubber composition, and it is more preferred that the entire cylindrical outer layer is formed from the first rubber composition.

The cylindrical outer layer and the cylindrical inner layer may have a uniform thickness, or may have a varied thickness. For example, the cylindrical outer layer and the cylindrical inner layer may be formed with a thickness gradually becoming thicker from one end toward another end along the axis direction thereof of the cylindrical grip. The cylindrical outer layer preferably has a uniform thickness.

When the cylindrical portion has a thickness in a range from 0.5 mm to 17.0 mm, the thickness of the cylindrical outer layer is preferably 0.5 mm or more, more preferably 0.6 mm or more, and even more preferably 0.7 mm or more, and is preferably 2.5 mm or less, more preferably 2.3 mm or less, and even more preferably 2.1 mm or less. If the thickness of the cylindrical outer layer is 0.5 mm or more, the reinforcing effect by the outer layer material becomes greater, and if the thickness of the cylindrical outer layer is 2.5 mm or less, the cylindrical inner layer can be relatively thickened and thus the effect of reducing the weight of the grip becomes greater.

The percentage ((thickness of cylindrical outer layer/thickness of cylindrical portion)×100) of the thickness of the cylindrical outer layer to the thickness of the cylindrical portion is preferably 0.5% or more, more preferably 1.0% or more, and even more preferably 1.5% or more, and is preferably 99.0% or less, more preferably 98.0% or less, and even more preferably 97.0% or less. If the above percentage is 0.5% or more, the reinforcing effect by the outer layer material becomes greater, and if the above percentage is 99.0% or less, the cylindrical inner layer can be relatively thickened and thus the effect of reducing the weight of the grip becomes greater.

The material hardness (Shore A hardness) of the second composition is preferably 10 or more, more preferably 15 or more, and even more preferably 20 or more, and is preferably 80 or less, more preferably 70 or less, and even more preferably 60 or less. If the material hardness (Shore A hardness) of the second composition is 10 or more, the cylindrical inner layer does not become excessively soft and thus a tightly fixed touch feeling when holding the grip is obtained, and if the material hardness (Shore A hardness) of the second composition is 80 or less, the cylindrical inner layer does not become excessively hard and thus the grip feeling when holding the grip becomes better.

The material hardness H1 (Shore A hardness) of the first rubber composition is preferably equal to or greater than the material hardness H2 (Shore A hardness) of the second composition. In this case, the hardness difference (H1-H2) (Shore A hardness) is preferably 0 or more, more preferably 10 or more, and even more preferably 20 or more, and is preferably 65 or less, more preferably 60 or less, and even more preferably 55 or less. If the hardness difference (H1-H2) falls within the above range, the grip feeling when holding the grip becomes better.

Examples of the combination of the cylindrical outer layer and the cylindrical inner layer include a combination of a solid outer layer and a solid inner layer, a combination of a solid outer layer and a porous inner layer, and a combination of a porous outer layer and a porous inner layer. Among them, the combination of the solid outer layer and the porous inner layer, and the combination of the porous outer layer and the porous inner layer are preferred. If the inner layer is porous, the grip has a light weight but the inner layer has a lowered mechanical strength. However, since the first rubber composition has an excellent mechanical strength, the mechanical strength of the grip can be maintained although the inner layer is porous.

The cylindrical inner layer is preferably a porous layer, and more preferably a foamed layer prepared by the balloon foaming method. When the cylindrical inner layer is prepared by the balloon foaming method, the amount of the microballoons in the second composition is preferably 5 parts by mass or more, more preferably 8 parts by mass or more, and even more preferably 12 parts by mass or more, and is preferably 20 parts by mass or less, more preferably 18 parts by mass or less, and even more preferably 15 parts by mass or less, with respect to 100 parts by mass of the base material (base rubber or base resin). If the amount of the microballoons is 5 parts by mass or more, the effect of reducing the weight of the grip becomes greater, and if the amount of the microballoons is 20 parts by mass or less, lowering in the mechanical strength of the cylindrical inner layer can be suppressed.

In addition, the foaming ratio of the cylindrical inner layer prepared by the balloon foaming method is preferably 1.2 or more, more preferably 1.5 or more, and even more preferably 1.8 or more, and is preferably 5.0 or less, more preferably 4.5 or less, and even more preferably 4.0 or less. If the foaming ratio is 1.2 or more, the effect of reducing the weight of the grip becomes greater, and if the foaming ratio is 5.0 or less, lowering in the mechanical strength of the cylindrical inner layer can be suppressed.

The golf club grip may be obtained by molding the first rubber composition in a mold. Examples of the molding method include a press molding method and an injection molding method. In addition, the golf club grip comprising an inner layer and an outer layer may be obtained, for example, by press molding a laminated product composed of an unvulcanized rubber sheet formed from the first rubber composition and an unvulcanized rubber sheet formed from the second rubber composition in a mold. When the press molding method is adopted, the temperature of the mold preferably ranges from 140° C. to 200° C., the molding time preferably ranges from 5 minutes to 40 minutes, and the molding pressure preferably ranges from 0.1 MPa to 100 MPa.

Examples of the shape of the golf club grip include a shape having a cylindrical portion for inserting a shaft and an integrally molded cap portion for covering the opening of the back end of the cylindrical portion, wherein at least a part of the outermost layer of the cylindrical portion is formed from the first rubber composition. Further, the cylindrical portion preferably has a laminated construction composed of the inner layer and the outer layer. In this case, the outer layer is formed from the first rubber composition.

The cylindrical portion may be formed with a fixed thickness along the axis direction thereof, or may be formed with a thickness gradually becoming thicker from the front end toward the back end. In addition, the cylindrical portion may be formed with a fixed thickness along the radius direction thereof, or a projecting strip part (so-called back line) may be formed on a part of the cylindrical portion. Furthermore, a groove may be formed on the surface of the cylindrical portion. Formation of a water film between the hand of the golfer and the grip may be suppressed by the groove, and thus the grip performance under a wet condition is further enhanced. In addition, in view of the anti-slipping performance and abrasion resistance of the grip, a reinforcing cord may be disposed in the grip.

The mass of the golf club grip is preferably 16 g or more, more preferably 18 g or more, and even more preferably 20 g or more, and is preferably 35 g or less, more preferably 32 g or less, and even more preferably 30 g or less.

[Golf Club]

The present invention also provides a golf club using the above golf club grip. The golf club comprises a shaft, a head provided on one end of the shaft, and a grip provided on another end of the shaft, wherein the grip is the above-described golf club grip. The shaft can be made of stainless steel or a carbon fiber reinforced resin. Examples of the head include a wood type, utility type, and iron type. The material constituting the head is not particularly limited, and examples thereof include titanium, titanium alloy, carbon fiber reinforced plastic, stainless steel, maraging steel, and soft iron.

Next, the golf club grip and the golf club will be explained with reference to figures. FIG. 1 is a perspective view showing one example of a golf club grip. A grip 1 comprises a cylindrical portion 2 for inserting a shaft, and an integrally molded cap portion 3 for covering the opening of the back end of the cylindrical portion.

Figure 2:
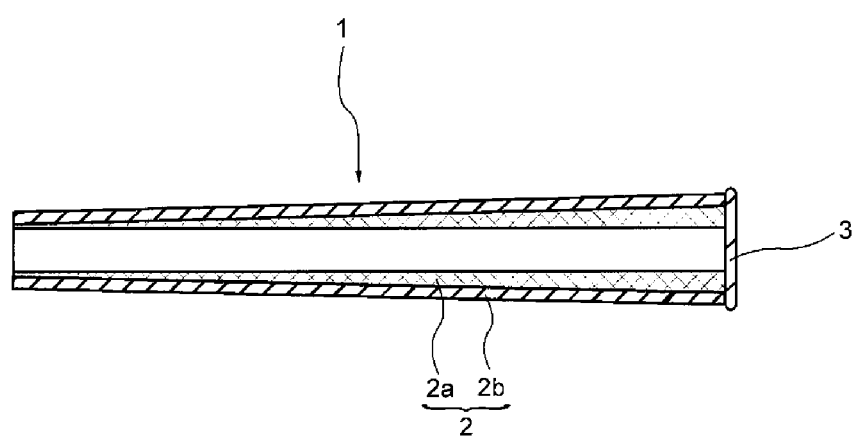
FIG. 2 is a schematic cross-sectional view showing one example of a golf club grip.

FIG. 2 is a schematic cross-sectional view showing one example of a golf club grip. The cylindrical portion 2 is composed of an inner layer 2a and an outer layer 2b. The outer layer 2b is formed with a uniform thickness throughout the entire region from the front end to the back end. The inner layer 2a is formed with a thickness gradually becoming thicker from the front end toward the back end. In the grip 1 shown in FIG. 2, the cap portion 3 is formed from the same rubber composition as that used in the outer layer 2b.

Figure 3:
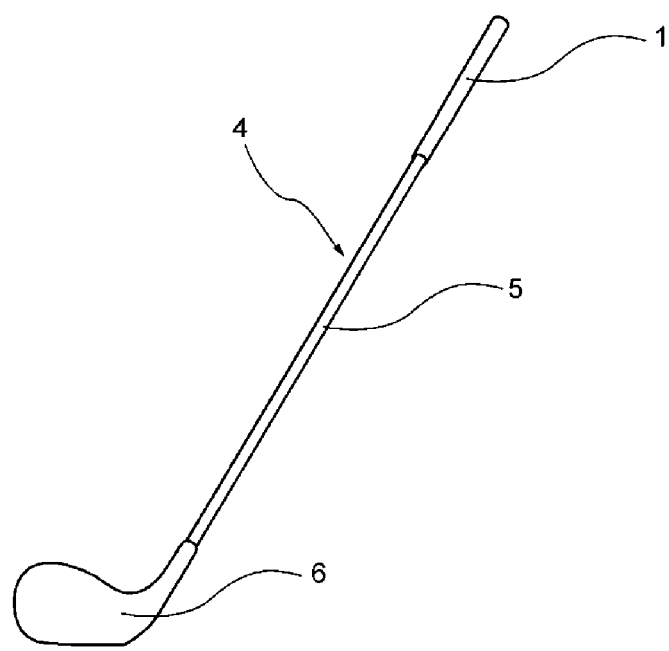
FIG. 3 is a perspective view showing one example of a golf club.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical portion 2 of the grip 1.

EXAMPLES

Next, the present invention will be described in detail by way of examples. However, the present invention is not limited to the examples described below. Various changes and modifications without departing from the spirit of the present invention can be made and are all included in the scope of the present invention.

[Evaluation Method]
(1) Amount of Acrylonitrile

The amount of acrylonitrile in the acrylonitrile-butadiene rubber before hydrogenation was measured according to ISO 24698-1 (2008).

(2) Amount of Double Bond (mmol/g)

The amount of double bond was calculated based on the amount of butadiene (mass %) and the amount of residual double bond (%) in the copolymer. The amount of residual double bond is a mass ratio (amount of double bond after hydrogenation/amount of double bond before hydrogenation) of the double bond in the copolymer after hydrogenation to the double bond in the copolymer before hydrogenation, and can be measured by infrared spectroscopy. When the acrylonitrile-butadiene rubber is the acrylonitrile-butadiene binary copolymer, the amount of butadiene in the copolymer is calculated by subtracting the amount of acrylonitrile (mass %) from 100.

Amount of double bond={amount of butadiene/45}× amount of residual double bond×10

(3) Amount of the Monomer Having the Carboxy Group 1 g of the acrylonitrile-butadiene rubber was weighed and dissolved in 50 ml of chloroform, and a thymol blue indicator was dripped therein. 0.05 mol/L sodium hydroxide methanol solution was dripped into the solution while the solution was being stirred, and the dripping amount (V ml) at the time the solution color initially changed was recorded. For a blank, i.e. 50 ml of chloroform in which no acrylonitrile-butadiene rubber was contained, the thymol blue was used as the indicator, 0.05 mol/L sodium hydroxide methanol solution was dripped into the solution, and the dripping amount (B ml) at the time the solution color initially changed was recorded. The amount of the monomer having the carboxy group was calculated according to the following formula.

Amount of the monomer having the carboxy group=$\{0.05 \times (V-B) \times PM\}/(10 \times X)$ (In the formula, V: dripping amount (ml) of the sodium hydroxide solution into the test solution, B: dripping amount (ml) of the sodium hydroxide solution into the blank, PM: molecular weight of the monomer having the carboxy group, and X: valence of the monomer having the carboxy group.)

(4) Material Hardness (Shore A hardness)

Sheets with a thickness of 2 mm were prepared by pressing the rubber composition at 160° C. for 8 to 20 minutes. It is noted that, in the case that the rubber composition contains the microballoons, the sheets were prepared by expanding the microballoons at the same foaming ratio as that when forming the grip. These sheets were stored at 23° C. for two weeks. Three of these sheets were stacked on one another so as not to be affected by the measuring base on which the sheets were placed, and the hardness of the stack was measured with an automatic hardness tester (Digitest II, available from Bareiss company) using a testing device of "Shore A".

(5) Abrasion Resistance Test

The abrasion resistance was evaluated by using a Gakushin type abrasion tester (II type abrasion tester available from Yasuda Seiki Seisakusho, Ltd.). Specifically, the rubber composition for constituting the surface layer of the grip was press-molded (molding temperature: 160° C., molding time: 15 min) to prepare a sheet with a thickness of 2 mm. The sheet was cut into a rectangular shape with a length of 130 mm and a width of 40 mm to prepare a test piece, and the test piece was fixed on a test piece table (semi-cylindrical shape (surface radius R: 200 mm)). A sand paper (#240) was provided on the surface of a friction block (surface radius R: 45 mm, 20×20 mm), and a region with a 10 cm length at the center part of the test piece was subjected to reciprocating friction for 500 times at a reciprocating speed of 30 times per minute under a load of 1.96 N. Afterwards, the abrasion resistance was evaluated based on the mass change of the test piece before and after the test. It is noted that the abrasion resistance of the grip No. 26 is defined as an index of 100, and the abrasion resistance is a value represented by converting the abrasion resistance of each grip into this index.

(6) Measurement of Dynamic Coefficient of Friction

The dynamic coefficient of friction was measured by using a static & dynamic friction tester (TL201Ts available from Trinity-Lab inc.). Specifically, a rubber sheet (2 cm in width and 6 cm in length) was cut from the golf club grip and used as a test piece. The rubber sheet was cut from the cylindrical portion of the grip. The test piece was fixed on a moving table of the apparatus, and the dynamic friction of the test piece was measured by using a tactile contactor on which a geometry fingerprint pattern was provided. The test was carried on at a moving distance of 1 cm, a moving speed of 1 mm/sec and a load of 25 g. The dynamic coefficient of friction was calculated by adopting the position where the friction movement was started as 0 cm and averaging the dynamic coefficients of friction obtained at a moving distance between 0.35 cm and 0.65 cm. It is noted that the coefficient of friction of the grip No. 26 is defined as an index of 100, and the coefficient of friction is a value represented by converting the coefficient of friction of each grip into this index.

(7) tan δ

The tan δ was measured with a dynamic viscoelasticity measuring apparatus (Rheogel-E4000 available from UBM Corporation). A test sample was prepared by pressing the outer layer rubber composition at 160° C. for 15 minutes to prepare a rubber plate, and punching this rubber plate into a given size. The measuring conditions were set as follows: temperature range: −100° C. to 100° C., temperature rising rate: 3° C./min, measuring interval: 3° C., frequency: 10 Hz, jig: stretching, and sample shape: 4 mm in width, 1 mm in thickness and 40 mm in length. The tan δ at 30° C. was calculated based on the obtained viscoelasticity spectrum by the dynamic viscoelasticity measurement.

[Production of Grip]

According to the formulations shown in Tables 1-4, raw materials were kneaded to prepare the outer layer rubber compositions and the inner layer rubber compositions. It is noted that, the outer layer rubber compositions were prepared by kneading all the raw materials with Banbury mixer, and the inner layer rubber compositions were prepared by kneading the raw materials other than the microballoons with Banbury mixer followed by blending the microballoons therein with a roll. The material temperature when kneading the inner layer rubber compositions with the Banbury mixer and the material temperature when blending the microballoons with the roll were lower than the expansion starting temperature of the microballoons.

TABLE 1

| Outer layer rubber composition No. | | | A | B | C | D | E | F | G | H | I | J | K |
|---|---|---|---|---|---|---|---|---|---|---|---|---|---|
| Formulation (parts by mass) | Base rubber | HXNBR | 100 | 100 | 100 | 100 | 100 | 100 | 100 | 100 | 100 | 100 | 100 |
| | | NR | — | — | — | — | — | — | — | — | — | — | — |
| | | EPDM | — | — | — | — | — | — | — | — | — | — | — |
| | | IIR | — | — | — | — | — | — | — | — | — | — | — |
| | | HNBR | — | — | — | — | — | — | — | — | — | — | — |
| | | XNBR | — | — | — | — | — | — | — | — | — | — | — |
| | | NBR | — | — | — | — | — | — | — | — | — | — | — |
| | Carbon black | SEAST SO | 5 | 10 | 20 | 30 | — | — | — | — | — | — | — |
| | | DIABLACK N220 | — | — | — | — | 5 | 10 | 30 | — | — | — | — |
| | | SEAST 600 | — | — | — | — | — | — | — | 5 | 10 | 20 | 30 |
| | | Showblack N134 | — | — | — | — | — | — | — | — | — | — | — |
| | | Asahi #15 | — | — | — | — | — | — | — | — | — | — | — |

TABLE 1-continued

| Outer layer rubber composition No. | | A | B | C | D | E | F | G | H | I | J | K |
|---|---|---|---|---|---|---|---|---|---|---|---|---|
| Reinforcing material | ULTRASIL VN3 GR | — | — | — | — | — | — | — | — | — | — | — |
| Crosslinking agent | Sulfur | 1.5 | 1.5 | 1.5 | 1.5 | 1.5 | 1.5 | 1.5 | 1.5 | 1.5 | 1.5 | 1.5 |
| Vulcanization accelerator | Sanceler TBzTD | 3 | 3 | 3 | 3 | 3 | 3 | 3 | 3 | 3 | 3 | 3 |
| | NOCCELER NS | — | — | — | — | — | — | — | — | — | — | — |
| | NOCCELER CZ | — | — | — | — | — | — | — | — | — | — | — |
| | SOXINOL D | 0.5 | 0.5 | 0.5 | 0.5 | 0.5 | 0.5 | 0.5 | 0.5 | 0.5 | 0.5 | 0.5 |
| Vulcanization activator | STRUKTOL ZP 1014 | 5 | 5 | 5 | 5 | 5 | 5 | 5 | 5 | 5 | 5 | 5 |
| | Zinc oxide | — | — | — | — | — | — | — | — | — | — | — |
| Antioxidant | NOCRAC NS-6 | — | — | — | — | — | — | — | — | — | — | — |
| | NOCRAC TBTU | 1 | 1 | 1 | 1 | 1 | 1 | 1 | 1 | 1 | 1 | 1 |
| Processing aid and modifier | Stearic acid | 1 | 1 | 1 | 1 | 1 | 1 | 1 | 1 | 1 | 1 | 1 |
| | HARITACK SE10 | 8 | 8 | 8 | 8 | 8 | 8 | 8 | 8 | 8 | 8 | 8 |
| | Sylvatac RE5S | 8 | 8 | 8 | 8 | 8 | 8 | 8 | 8 | 8 | 8 | 8 |
| | PW380 | — | — | — | — | — | — | — | — | — | — | — |
| Properties of carbon black | DBP absorption amount (cm$^3$/100 g) | 115 | 115 | 115 | 115 | 115 | 115 | 115 | 75 | 75 | 75 | 75 |
| | CTAB specific surface area (m$^2$/g) | 42 | 42 | 42 | 42 | 111 | 111 | 111 | 106 | 106 | 106 | 106 |

TABLE 2

| Outer layer rubber composition No. | | L | M | N | O | P | Q | R | S | T | U |
|---|---|---|---|---|---|---|---|---|---|---|---|
| Formulation (parts by mass) | Base rubber HXNBR | 100 | 100 | 100 | 100 | 100 | 100 | 100 | 100 | 100 | — |
| | NR | — | — | — | — | — | — | — | — | — | 70 |
| | EPDM | — | — | — | — | — | — | — | — | — | 30 |
| | IIR | — | — | — | — | — | — | — | — | — | 5 |
| | HNBR | — | — | — | — | — | — | — | — | — | — |
| | XNBR | — | — | — | — | — | — | — | — | — | — |
| | NBR | — | — | — | — | — | — | — | — | — | — |
| | Carbon black SEAST SO | — | — | — | — | — | — | — | — | — | — |
| | DIABLACK N220 | — | — | — | — | — | — | — | — | — | 4 |
| | SEAST 600 | — | — | — | — | — | — | — | — | — | — |
| | Showblack N134 | 3 | 5 | 10 | 20 | 30 | — | — | — | — | — |
| | Asahi #15 | — | — | — | — | — | 5 | 10 | 20 | 30 | — |
| | Reinforcing material ULTRASIL VN3 GR | — | — | — | — | — | — | — | — | — | 8 |
| | Crosslinking agent Sulfur | 1.5 | 1.5 | 1.5 | 1.5 | 1.5 | 1.5 | 1.5 | 1.5 | 1.5 | 2.0 |
| | Vulcanization accelerator Sanceler TBzTD | 3 | 3 | 3 | 3 | 3 | 3 | 3 | 3 | 3 | — |
| | NOCCELER NS | — | — | — | — | — | — | — | — | — | 1 |
| | NOCCELER CZ | — | — | — | — | — | — | — | — | — | 1 |
| | SOXINOL D | 0.5 | 0.5 | 0.5 | 0.5 | 0.5 | 0.5 | 0.5 | 0.5 | 0.5 | 1 |
| | Vulcanization activator STRUKTOL ZP 1014 | 5 | 5 | 5 | 5 | 5 | 5 | 5 | 5 | 5 | — |
| | Zinc oxide | — | — | — | — | — | — | — | — | — | 3 |
| | Antioxidant NOCRAC NS-6 | — | — | — | — | — | — | — | — | — | 0.5 |
| | NOCRAC TBTU | 1 | 1 | 1 | 1 | 1 | 1 | 1 | 1 | 1 | — |
| | Processing aid and modifier Stearic acid | 1 | 1 | 1 | 1 | 1 | 1 | 1 | 1 | 1 | 1 |
| | HARITACK SE10 | 8 | 8 | 8 | 8 | 8 | 8 | 8 | 8 | 8 | — |
| | Sylvatac RE5S | 8 | 8 | 8 | 8 | 8 | 8 | 8 | 8 | 8 | — |
| | PW380 | — | — | — | — | — | — | — | — | — | 2 |
| Properties of carbon black | DBP absorption amount (cm$^3$/100 g) | 127 | 127 | 127 | 127 | 127 | 41 | 41 | 41 | 41 | — |
| | CTAB specific surface area (m$^2$/g) | 142 | 142 | 142 | 142 | 142 | 12 | 12 | 12 | 12 | — |

TABLE 3

| Outer layer rubber composition No. | | V | W | X | Y | Z |
|---|---|---|---|---|---|---|
| Formulation (parts by mass) | Base rubber HXNBR | — | — | — | — | 100 |
| | NR | — | — | — | — | — |
| | EPDM | — | — | — | — | — |
| | IIR | — | — | — | — | — |
| | HNBR | 100 | 100 | — | — | — |

TABLE 3-continued

| Outer layer rubber composition No. | | V | W | X | Y | Z |
|---|---|---|---|---|---|---|
| | XNBR | — | — | 100 | — | — |
| | NBR | — | — | — | 100 | — |
| Carbon black | SEAST SO | 20 | — | — | — | — |
| | DIABLACK N220 | — | — | — | — | — |
| | SEAST 600 | — | — | — | — | — |
| | Showblack N134 | — | 5 | 5 | 5 | 5 |
| | Asahi #15 | — | — | — | — | — |
| Reinforcing material | ULTRASIL VN3 GR | — | — | — | — | — |
| Crosslinking agent | Sulfur | 1.5 | 1.5 | 1.5 | 1.5 | 1.5 |
| Vulcanization accelerator | Sanceler TBzTD | 3 | 3 | 3 | 3 | 3 |
| | NOCCELER NS | — | — | — | — | — |
| | NOCCELER CZ | — | — | — | — | — |
| | SOXINOL D | 0.5 | 0.5 | 0.5 | 0.5 | 0.5 |
| Vulcanization activator | STRUKTOL ZP 1014 | 5 | 5 | 5 | 5 | 5 |
| | Zinc oxide | — | — | — | — | — |
| Antioxidant | NOCRAC NS-6 | — | — | — | — | — |
| | NOCRAC TBTU | 1 | 1 | 1 | 1 | 1 |
| Processing aid and modifier | Stearic acid | 1 | 1 | 1 | 1 | 1 |
| | HARITACK SE10 | 8 | 8 | 8 | 8 | — |
| | Sylvatac RE5S | 8 | 8 | 8 | 8 | — |
| | PW380 | — | — | — | — | — |
| Properties of carbon black | DBP absorption amount (cm$^3$/100 g) | 115 | 127 | 127 | 127 | 127 |
| | CTAB specific surface area (m$^2$/g) | 42 | 142 | 142 | 142 | 142 |

TABLE 4

| | | | Inner layer rubber composition No. | |
|---|---|---|---|---|
| | | | a | b |
| Formulation (parts by mass) | Base rubber | HNBR | 100 | — |
| | | NR | — | 70 |
| | | EPDM | — | 30 |
| | | IIR | — | 5 |
| | Reinforcing material | SEAST SO | 5 | — |
| | | DIABLACK N220 | — | 4 |
| | | ULTRASIL VN3 GR | — | 8 |
| | Crosslinking agent | Sulfur | 1.5 | 2.0 |
| | Vulcanization accelerator | Sanceler TBzTD | 3 | — |
| | | NOCCELER NS | — | 1 |
| | | NOCCELER CZ | — | 1 |
| | | SOXINOL D | 0.5 | 1 |
| | Vulcanization activator | STRUKTOL ZP 1014 | 5 | — |
| | | Zinc oxide | — | 3 |
| | Antioxidant | NOCRAC NS-6 | — | 0.5 |
| | Retarder | SANTOGARD PVI | — | 0.5 |
| | | Benzoic acid | — | 0.3 |
| | Processing aid and modifier | Stearic acid | 1 | 1 |
| | | ADK CIZER RS735 | 5 | — |
| | | PW380 | — | 2 |
| | | Koresin | 10 | — |
| | Foaming agent | Microballoons | 10 | 12 |

Materials used in Tables 1-4 are shown below.

HXNBR: hydrogenated carboxy-modified acrylonitrile-butadiene rubber (Therban XT VPKA 8889 (amount of residual double bond: 3.5%, amount of acrylonitrile: 33.0 mass %, amount of double bond: 0.40 mmol/g, amount of the monomer having the carboxy group: 5.0 mass %) available from Lanxess Corporation)

HNBR: hydrogenated acrylonitrile-butadiene rubber (Therban 3446 (amount of residual double bond: 4.0%, amount of acrylonitrile: 34.0 mass %) available from Lanxess Corporation)

XNBR: carboxy-modified acrylonitrile-butadiene rubber (Krynac X750 (amount of acrylonitrile: 27 mass %, amount of the monomer having the carboxy group: 0.4 mass %) available from Lanxess Corporation)

NBR: acrylonitrile-butadiene rubber (Krynac (registered trademark) 3345F (amount of acrylonitrile: 33.0 mass %) available from Lanxess Corporation)

NR (natural rubber): TSR20

EPDM (ethylene-propylene-diene rubber): ESPRENE (registered trademark) 505A available from Sumitomo Chemical Co., Ltd.

IIR: JSR BUTYL065 available from JSR Corporation

SEAST (registered trademark) SO: carbon black (DBP absorption amount: 115 cm$^3$/100 g, CTAB specific surface area: 42 m$^2$/g) available from Tokai Carbon Co., Ltd.

DIABLACK (registered trademark) N220: carbon black (DBP absorption amount: 115 cm$^3$/100 g, CTAB specific surface area: 111 m$^2$/g) available from Mitsubishi Chemical Corporation.

SEAST 600: carbon black (DBP absorption amount: 75 cm$^3$/100 g, CTAB specific surface area: 106 m$^2$/g) available from Tokai Carbon Co., Ltd.

Showblack N134: carbon black (DBP absorption amount: 127 cm$^3$/100 g, CTAB specific surface area: 142 m$^2$/g) available from Mitsubishi Chemical Corporation Asahi #15: carbon black (DBP absorption amount: 41 cm$^3$/100 g. CTAB specific surface area: 12 m$^2$/g) available from Asahi Carbon Co., Ltd.

ULTRASIL VN3 GR: granulated silica (amorphous) available from Evonik Co., Ltd.

Sulfur: 5% oil treated sulfur fine powder (200 mesh) available from Tsurumi Chemical Industry Co., Ltd.

Sanceler (registered trademark) TBzTD: tetrabenzylthiuram disulfide available from Sanshin Chemical Industry Co., Ltd.

NOCCELER (registered trademark) NS: N-t-butyl-2-benzothiazolylsulfenamide available from Ouchi Shinko Chemical Industry Co., Ltd.

NOCCELER CZ: N-cyclohexyl-2-benzothiazolylsulfenamide available from Ouchi Shinko Chemical Industry Co., Ltd.

SOXINOL D: 1,3-diphenyl guanidine available from Sumitomo Chemical Co., Ltd.

STRUKTOL ZP 1014: a product containing zinc peroxide in an amount of 29 mass % available from Struktol Company Zinc oxide: WHITE SEAL available from PT. INDO LYSAGHT Company SEAST (registered trademark) SO: carbon black available from Tokai Carbon Co., Ltd.

NOCRAC (registered trademark) NS-6: 2,2'-methylene bis(4-methyl-6-t-butylphenol) available from Ouchi Shinko Chemical Industry Co., Ltd.

NOCRAC TBTU: tributyl thiourea available from Ouchi Shinko Chemical Industry Co., Ltd.

Stearic acid: beads stearic acid camellia available from NOF Co., Ltd.

HARITACK SE10: hydrogenated rosin ester (softening point: 78° C. to 87° C., acid value: 2 mgKOH/g to 10 mgKOH/g) available from Harima Chemicals Group, Inc.

Sylvatac RE5S: available from Arizona Chemical Co., Ltd.

PW380: Diana Process Oil PW380 available from Idemitsu Kosan Co., Ltd.

SANTOGARD PVI: N-cyclohexyl thiophthalimide available from Sanshin Chemical Industry Co., Ltd.

Benzoic acid: available from Sigma-Aldrich Corporation

ADK CIZER (registered trademark) RS735: available from ADEKA Corporation

Koresin (registered trademark): butylphenol-acetylene condensate (softening point: 135° C. to 150° C.) available from BASF Ltd.

Microballoons: "Expancel (registered trademark) 909-80DU" (resin capsules encapsulating a hydrocarbon having a low boiling point in a shell formed from a thermoplastic resin, volume average particle size: 18 μm to 24 μm, expansion starting temperature: 120° C. to 130° C.) available from Akzo Nobel Company The unvulcanized rubber sheet having a fan shape and the cap member were prepared from the outer layer rubber composition. It is noted that the outer layer rubber sheet was formed with a fixed thickness. The unvulcanized rubber sheet having a rectangular shape was prepared from the inner layer rubber composition. It is noted that the inner layer rubber sheet was formed with a thickness gradually becoming thicker from one end toward another end. The inner layer rubber sheet was wound around a mandrel, an adhesive composition was applied thereto, and then the outer layer rubber sheet was laminated and wound around thereon. The mandrel provided with these wound rubber sheets, and the cap member were charged into a mold provided with a groove pattern on the cavity surface thereof. Then, a heat treatment was carried out at a mold temperature of 160° C. for a heating time of 15 minutes to obtain golf club grips. In the obtained golf club grips, the cylindrical portion had a thickness of 1.5 mm at the thinnest part (the end on the head side), and a thickness of 6.7 mm at the thickest part (the end on the grip end side). Evaluation results for each of the grips are shown in Tables 5-6.

TABLE 5

| | Grip No. | 1 | 2 | 3 | 4 | 5 | 6 | 7 | 8 |
|---|---|---|---|---|---|---|---|---|---|
| Outer layer | Rubber composition No. | C | E | F | I | J | L | M | N |
| | Product obtained by multiplying CB amount by DBP absorption amount | 2300 | 575 | 1150 | 750 | 1500 | 381 | 635 | 1270 |
| | Product obtained by multiplying CB amount by CTAB specific surface area | 840 | 555 | 1110 | 1060 | 2120 | 426 | 710 | 1420 |
| | Material hardness (Shore A) | 55 | 49 | 51 | 51 | 54 | 52 | 49 | 53 |
| | Type | Solid | Solid | Solid | Solid | Solid | Solid | Solid | Solid |
| | Thickness (mm) | 0.2 | 0.2 | 0.2 | 0.2 | 0.2 | 0.2 | 0.2 | 0.2 |
| Inner layer | Rubber composition No. | a | a | a | a | a | a | a | a |
| | Material hardness (Shore A) | 39 | 39 | 39 | 39 | 39 | 39 | 39 | 39 |
| | Type | Foamed | Foamed | Foamed | Foamed | Foamed | Foamed | Foamed | Foamed |
| | Foaming ratio | 3.3 | 3.3 | 3.3 | 3.3 | 3.3 | 3.3 | 3.3 | 3.3 |
| Evaluation | Weight (g) | 23 | 23 | 23 | 23 | 23 | 23 | 23 | 23 |
| | Dynamic coefficient of friction | 106 | 105 | 97 | 101 | 99 | 99 | 108 | 110 |
| | Abrasion resistance | 562 | 544 | 542 | 509 | 626 | 531 | 537 | 531 |
| | tan δ | 0.176 | 0.178 | 0.175 | 0.177 | 0.192 | 0.180 | 0.181 | 0.186 |

| | | Grip No. | 9 | 10 | 11 | 12 | 13 | 14 |
|---|---|---|---|---|---|---|---|---|
| Outer layer | Rubber composition No. | | O | V | W | X | Y | Z |
| | Product obtained by multiplying CB amount by DBP absorption amount | | 2540 | 2300 | 635 | 635 | 635 | 635 |

TABLE 5-continued

|  |  |  |  |  |  |  |  |
|---|---|---|---|---|---|---|---|
|  | Product obtained by multiplying CB amount by CTAB specific surface area | 2840 | 840 | 710 | 710 | 710 | 710 |
|  | Material hardness (Shore A) | 58 | 51 | 46 | 41 | 36 | 53 |
|  | Type | Solid | Solid | Solid | Solid | Solid | Solid |
|  | Thickness (mm) | 0.2 | 0.2 | 0.2 | 0.2 | 0.2 | 0.2 |
| Inner layer | Rubber composition No. | a | a | a | a | a | b |
|  | Material hardness (Shore A) | 39 | 39 | 39 | 39 | 39 | 26 |
|  | Type | Foamed | Foamed | Foamed | Foamed | Foamed | Foamed |
|  | Foaming ratio | 3.3 | 3.3 | 3.3 | 3.3 | 3.3 | 3.3 |
| Evaluation | Weight (g) | 23 | 23 | 23 | 23 | 23 | 23 |
|  | Dynamic coefficient of friction | 108 | 105 | 104 | 113 | 123 | 97 |
|  | Abrasion resistance | 596 | 230 | 149 | 969 | 118 | 700 |
|  | tan δ | 0.199 | 0.120 | 0.109 | 0.273 | 0.224 | 0.150 |

TABLE 6

|  |  | Grip No. | 15 | 16 | 17 | 18 | 19 | 20 | 21 |
|---|---|---|---|---|---|---|---|---|---|
| Outer layer | Rubber composition No. |  | A | B | D | G | H | K | P |
|  | Product obtained by multiplying CB amount by DBP absorption amount |  | 575 | 1150 | 3450 | 3450 | 375 | 2250 | 3810 |
|  | Product obtained by multiplying CB amount by CTAB specific surface area |  | 210 | 420 | 1260 | 3330 | 530 | 3180 | 4260 |
|  | Material hardness (Shore A) |  | 50 | 51 | 63 | 62 | 51 | 62 | 66 |
|  | Type |  | Solid | Solid | Solid | Solid | Solid | Solid | Solid |
|  | Thickness (mm) |  | 0.2 | 0.2 | 0.2 | 0.2 | 0.2 | 0.2 | 0.2 |
| Inner layer | Rubber composition No. |  | a | a | a | a | a | a | a |
|  | Material hardness (Shore A) |  | 39 | 39 | 39 | 39 | 39 | 39 | 39 |
|  | Type |  | Foamed | Foamed | Foamed | Foamed | Foamed | Foamed | Foamed |
|  | Foaming ratio |  | 3.3 | 3.3 | 3.3 | 3.3 | 3.3 | 3.3 | 3.3 |
| Evaluation | Weight (g) |  | 23 | 23 | 23 | 23 | 23 | 23 | 23 |
|  | Dynamic coefficient of friction |  | 89 | 94 | 88 | 95 | 90 | 96 | 92 |
|  | Abrasion resistance |  | 508 | 528 | 584 | 569 | 562 | 594 | 620 |
|  | tan δ |  | 0.164 | 0.170 | 0.202 | 0.211 | 0.171 | 0.211 | 0.208 |

|  |  | Grip No. | 22 | 23 | 24 | 25 | 26 |
|---|---|---|---|---|---|---|---|
| Outer layer | Rubber composition No. |  | Q | R | S | T | U |
|  | Product obtained by multiplying CB amount by DBP absorption amount |  | 205 | 410 | 820 | 1230 | 460 |
|  | Product obtained by multiplying CB amount by CTAB specific surface area |  | 60 | 120 | 240 | 360 | 444 |
|  | Material hardness (Shore A) |  | 48 | 51 | 52 | 56 | 45 |
|  | Type |  | Solid | Solid | Solid | Solid | Solid |
|  | Thickness (mm) |  | 0.2 | 0.2 | 0.2 | 0.2 | 0.2 |
| Inner layer | Rubber composition No. |  | a | a | a | a | b |
|  | Material hardness (Shore A) |  | 39 | 39 | 39 | 39 | 26 |
|  | Type |  | Foamed | Foamed | Foamed | Foamed | Foamed |
|  | Foaming ratio |  | 3.3 | 3.3 | 3.3 | 3.3 | 3.3 |

TABLE 6-continued

| | | | | | | |
|---|---|---|---|---|---|---|
| Evaluation | Weight (g) | 23 | 23 | 23 | 23 | 23 |
| | Dynamic coefficient of friction | 78 | 94 | 96 | 88 | 100 |
| | Abrasion resistance | 493 | 503 | 518 | 538 | 100 |
| | tan δ | 0.181 | 0.189 | 0.192 | 0.191 | 0.0784 |

The grips No. 1 to 14 are the cases that the outer layer of the cylindrical portion is formed from a rubber composition containing (A) a base rubber and (B) carbon black, wherein (B) the carbon black has a DBP absorption amount in a range from 50 to 140 cm$^3$/100 g and a CTAB specific surface area in a range from 30 to 160 m$^2$/g, a product (amount×DBP absorption amount) ranges from 380 to 2600, a product (amount×CTAB specific surface area) ranges from 425 to 3000, and the outer layer has tan δ(30° C., 10 Hz) in a range from 0.100 to 0.280. These grips No. 1 to 14 have excellent abrasion resistance and a high coefficient of friction.

The grips No. 15 to 21 are the cases that the product (amount×DBP absorption amount) of the outer layer rubber composition is less than 380 or more than 2600, or the product (amount×CTAB specific surface area) of the outer layer rubber composition is less than 425 or more than 3000. Although these grips No. 15 to 21 have excellent abrasion resistance, they have a low coefficient of friction.

The grips No. 22 to 25 are the cases that the outer layer rubber composition does not contain carbon black having the specified properties. These grips No. 22 to 25 have poor abrasion resistance and a low coefficient of friction.

This application is based on Japanese patent application No. 2017-207766 filed on Oct. 27, 2017, the content of which is hereby incorporated by reference.

The invention claimed is:

1. A golf club grip comprising an outermost, layer, wherein at least a part of the outermost layer is formed from a rubber composition containing (A) a base rubber and (B) carbon black,
   (B) the carbon black has a DBP absorption amount in a range from 50 cm$^3$/100 g to 140 cm$^3$/100 g and a CTAB specific surface area in a range from 30 m$^2$/g to 160 m$^2$/g,
   a product (amount×DBP absorption amount) obtained by multiplying an amount (g) of (B) the carbon black in the rubber composition with respect to 100 g of (A) the base rubber by the DBP absorption amount (cm$^3$/100 g) ranges from 380 to 2600,
   a product (amount×CTAB specific surface area) obtained by multiplying the amount (g) of (B) the carbon black in the rubber composition with respect to 100 g of (A) the base rubber by the CTAB specific surface area (m$^2$/g) ranges from 425 to 3000, and
   the part formed from the rubber composition has tan δ(30° C., 10 Hz) in a range from 0.100 to 0.280.

2. The golf club grip according to claim 1, wherein the rubber composition has a material hardness in a range from 35 to 59 in Shore A hardness.

3. The golf club grip according to claim 1, wherein the rubber composition contains (B) the carbon black in an amount of ranging from 3 parts by mass to 20 parts by mass with respect to 100 parts by mass of (A) the base rubber.

4. The golf club grip according to claim 1, wherein (A) the base rubber contains at least one member selected from the group consisting of a carboxy-modified acrylonitrile-butadiene rubber, a hydrogenated acrylonitrile-butadiene rubber and a carboxy-modified hydrogenated-acrylonitrile-butadiene rubber.

5. The golf club grip according to claim 1, wherein the rubber composition further contains a crosslinking agent in an amount ranging from 0.2 part by mass to 4.0 parts by mass with respect to 100 parts by mass of (A) the base rubber.

6. The golf club grip according to claim 5, wherein the crosslinking agent is an elemental sulfur.

7. The golf club grip according to claim 5, wherein the rubber composition further contains a vulcanization accelerator in an amount ranging from 0.4 part by mass to 8.0 parts by mass with respect to 100 parts by mass of (A) the base rubber, and/or a vulcanization activator in an amount ranging from 0.5 part by mass to 10.0 parts by mass with respect to 100 parts by mass of (A) the base rubber.

8. The golf club grip according to claim 1, wherein the rubber composition essentially does not contain a reinforcing material other than (B) the carbon black.

9. The golf club grip according to claim 1, wherein the golf club grip comprises a dual-layered cylindrical portion composed of a cylindrical inner layer and a cylindrical outer layer covering the cylindrical inner layer,
   the cylindrical outer layer is formed from the rubber composition, and
   a hardness difference (H1-H2) between a material hardness H1 of the rubber composition for forming the cylindrical outer layer and a material hardness H2 of a composition for forming the cylindrical inner layer ranges from 0 to 65 in Shore A hardness.

10. A golf club comprising a shaft, a head provided on one end of the shaft, and a grip provided on another end of the shaft, wherein the grip is a golf club grip comprising an outermost layer, and
   wherein at least a part of the outermost layer is formed from a rubber composition containing (A) a base rubber and (B) carbon black,
   (B) the carbon black has a DBP absorption amount in a range from 50 cm$^3$/100 g to 140 cm$^3$/100 g and a CTAB specific surface area in a range from 30 m$^2$/g to 160 m$^2$/g,
   a product (amount×DBP absorption amount) obtained by multiplying an amount (g) of (B) the carbon black in the rubber composition with respect to 100 g of (A) the base rubber by the DBP absorption amount (cm$^3$/100 g) ranges from 380 to 2600,
   a product (amount×CTAB specific surface area) obtained by multiplying the amount (g) of (B) the carbon black in the rubber composition with respect to 100 g of (A) the base rubber by the CTAB specific surface area (m$^2$/g) ranges from 425 to 3000, and
   the part formed from the rubber composition has tan δ(30° C., 10 Hz) in a range from 0.100 to 0.280.

11. The golf club according to claim 10, wherein the rubber composition has a material hardness in a range from 35 to 59 in Shore A hardness.

12. The golf club according to claim 10, wherein the rubber composition contains (B) the carbon black in an amount ranging from 3 parts by mass to 20 parts by mass with respect to 100 parts by mass of (A) the base rubber.

13. The golf club according to claim 10, wherein (A) the base rubber contains at least one member selected from the group consisting of a carboxy-modified acrylonitrile-butadiene rubber, a hydrogenated acrylonitrile-butadiene rubber and a carboxy-modified hydrogenated acrylonitrile-butadiene rubber.

14. The golf club grip according to claim 10, wherein the rubber composition further contains a crosslinking agent in an amount ranging from 0.2 part by mass to 4.0 parts by mass with respect to 100 parts by mass of (A) the base rubber.

15. The golf club grip according to claim 14, wherein the crosslinking agent is an elemental sulfur.

16. The golf club grip according to claim 14, wherein the rubber composition further contains a vulcanization accelerator in an amount ranging from 0.4 part by mass to 8.0 parts by mass with respect to 100 parts by mass of (A) the base rubber, and/or a vulcanization activator in an amount ranging from 0.5 part by mass to 10.0 parts by mass with respect to 100 parts by mass of (A) the base rubber.

17. The golf club grip according to claim 10, wherein the rubber composition essentially does not contain a reinforcing material other than (B) the carbon black.

18. The golf club grip according to claim 10, wherein the golf club grip comprises a dual-layered cylindrical portion composed of a cylindrical inner layer and a cylindrical outer layer covering the cylindrical inner layer, the cylindrical outer layer is formed from the rubber composition, and a hardness difference (H1-H2) between a material hardness H1 of the rubber composition for forming the cylindrical outer layer and a material hardness H2 of a composition for forming the cylindrical inner layer ranges from 0 to 65 in Shore A hardness.

19. The golf club grip according to claim 1, wherein (B) the carbon black has a CTAB specific surface area in a range from 106 $m^2$/g to 160 $m^2$/g.

20. The golf club according to, claim 10, wherein (B) the carbon black has a CTAB specific surface area in a range, from 106 $m^2$/g to 160 $m^2$/g.

* * * * *